(12) United States Patent
Lu et al.

(10) Patent No.: US 8,539,161 B2
(45) Date of Patent: Sep. 17, 2013

(54) PRE-FETCHING CONTENT ITEMS BASED ON SOCIAL DISTANCE

(75) Inventors: Bo Lu, Seattle, WA (US); Raghavendra Malpani, Redmond, WA (US); Joseph A. Porkka, Bellevue, WA (US); Bartosz Henryk Paliswiat, Kirkland, WA (US); Christian Bøgh Jensen, Seattle, WA (US); Sushil Kumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 403 days.

(21) Appl. No.: 12/577,464

(22) Filed: Oct. 12, 2009

(65) Prior Publication Data

US 2011/0087842 A1    Apr. 14, 2011

(51) Int. Cl.
*G06F 12/00* (2006.01)
*G06F 13/00* (2006.01)
*G06F 13/28* (2006.01)
*G06F 15/16* (2006.01)
*G06Q 99/00* (2006.01)

(52) U.S. Cl.
USPC ........... 711/133; 711/126; 709/206; 709/217; 705/319

(58) Field of Classification Search
USPC .......... 711/126, 133; 709/206, 217; 705/319
See application file for complete search history.

(56) References Cited

U.S. PATENT DOCUMENTS

| | | |
|---|---|---|
| 2004/0162830 A1 | 8/2004 | Shirwadkar et al. |
| 2007/0271232 A1 | 11/2007 | Mattox et al. |
| 2008/0033776 A1* | 2/2008 | Marchese ..................... 705/8 |
| 2008/0040474 A1 | 2/2008 | Zuckerberg et al. |
| 2008/0215623 A1 | 9/2008 | Ramer et al. |
| 2008/0301112 A1 | 12/2008 | Wu |
| 2010/0057555 A1* | 3/2010 | Butterfield et al. ......... 705/14.41 |
| 2010/0164947 A1* | 7/2010 | Bolger et al. ................. 345/419 |

FOREIGN PATENT DOCUMENTS

| | | |
|---|---|---|
| WO | 2006115919 A2 | 11/2006 |
| WO | 2009001138 A1 | 12/2008 |

OTHER PUBLICATIONS

"Privacy Filters and Facebook", retrieved at <<http://simoncast.blogspot.com/2008/10/privacy-filters-and-facebook.html>>, Oct. 2, 2008, pp. 4.
Ankolekar, et al., "Friendlee: A Mobile Application for Your Social Life", retrieved at <<http://www.hpl.hp.com/research/scl/papers/friendlee/friendlee.pdf>>, ACM, Sep. 15-18, 2009, pp. 4.
Said, et al., "Data Prefetching Algorithm in Mobile Environments", retrieved at <<http://www.eurojournals.com/ejsr_28_3_14.pdf>>, European Journal of Scientific Research, vol. 28 No. 3 (2009), pp. 478-491.

(Continued)

*Primary Examiner* — Ryan Bertram

(57) ABSTRACT

Retrieving content items based on a social distance between a user and content providers. The social distance is determined based on, for example, user interaction with the content providers. The content providers are ranked, for the user, based on the determined social distance. Prior to a request from the user, the content items are pre-fetched based on the ranked content providers and constraints such as storage space, bandwidth, and battery power level of a computing device of the user. In some embodiments, additional content items are retrieved, or retrieved content items are deleted, as a variable-size cache on the computing device fills or changes size.

20 Claims, 4 Drawing Sheets

(56) References Cited

OTHER PUBLICATIONS

Yin, et al., "Power-Aware Prefetch in Mobile Environments", retrieved at <<http://ieeexplore.ieee.org/stamp/stamp.jsp?arnumber=01022307>>, Proceedings of the 22 nd International Conference on Distributed Computing Systems, 2002, pp. 8.

Song, et al., Cache-Miss-Initiated Prefetch in Mobile Environments*, retrieved at <<http://ieeexplore.ieee.org/stamp/stamp.jsp?arnumber=01263086>>, Proceedings of the IEEE International Conference on Mobile Data Management, 2004, pp. 12.

Tuah, et al., "Resource-Aware Speculative Prefetching in Wireless Networks", retrieved at <<http://portal.acm.org/citation.cfm?id=602413.602418>>, Kluwer Academic Publishers, 2003, pp. 61-72.

"International Search Report", Mailed Date: May 31, 2011, Application No. PCT/US2010/052120, Filed Date: Oct. 10, 2010, pp. 8.

* cited by examiner

PRE-FETCHING CONTENT ITEMS BASED ON SOCIAL DISTANCE

BACKGROUND

Web sites enable users to post messages, images, music, video clips, and more for sharing with other users. For example, some users post hundreds of new photos each month. Because of the high volume and availability of this social content, selecting content of interest for a particular user to consume is time-consuming. Further, because of the high-latency and low-bandwidth of existing cellular data networks, users often have poor experiences when browsing large sets of data such as photos. Some existing systems enable the user to subscribe to receive newly posted content of interest from various content providers or authors. These existing systems, however, do not scale well as the user (and a computing device of the user) quickly becomes inundated with content with each additional subscription.

Other existing systems enable the content provider to establish permissions allowing users to access selected content from the content provider. Such systems, however, fail to account for preferences of the user as well as computing resources available to the user.

SUMMARY

Embodiments of the disclosure enable the selective retrieval of content items based on social distance and device constraints. A list of content items is accessed. Each of the content items on the list has an associated content provider. Each content provider has an associated social distance value. The social distance value represents a relationship between the content provider and a user. Constraints associated with a computing device of the user are determined. One or more of the content items on the list are selectively retrieved based on the social distance value and as a function of the determined constraints. The content items are selectively retrieved prior to receiving a request from the user for the content items.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
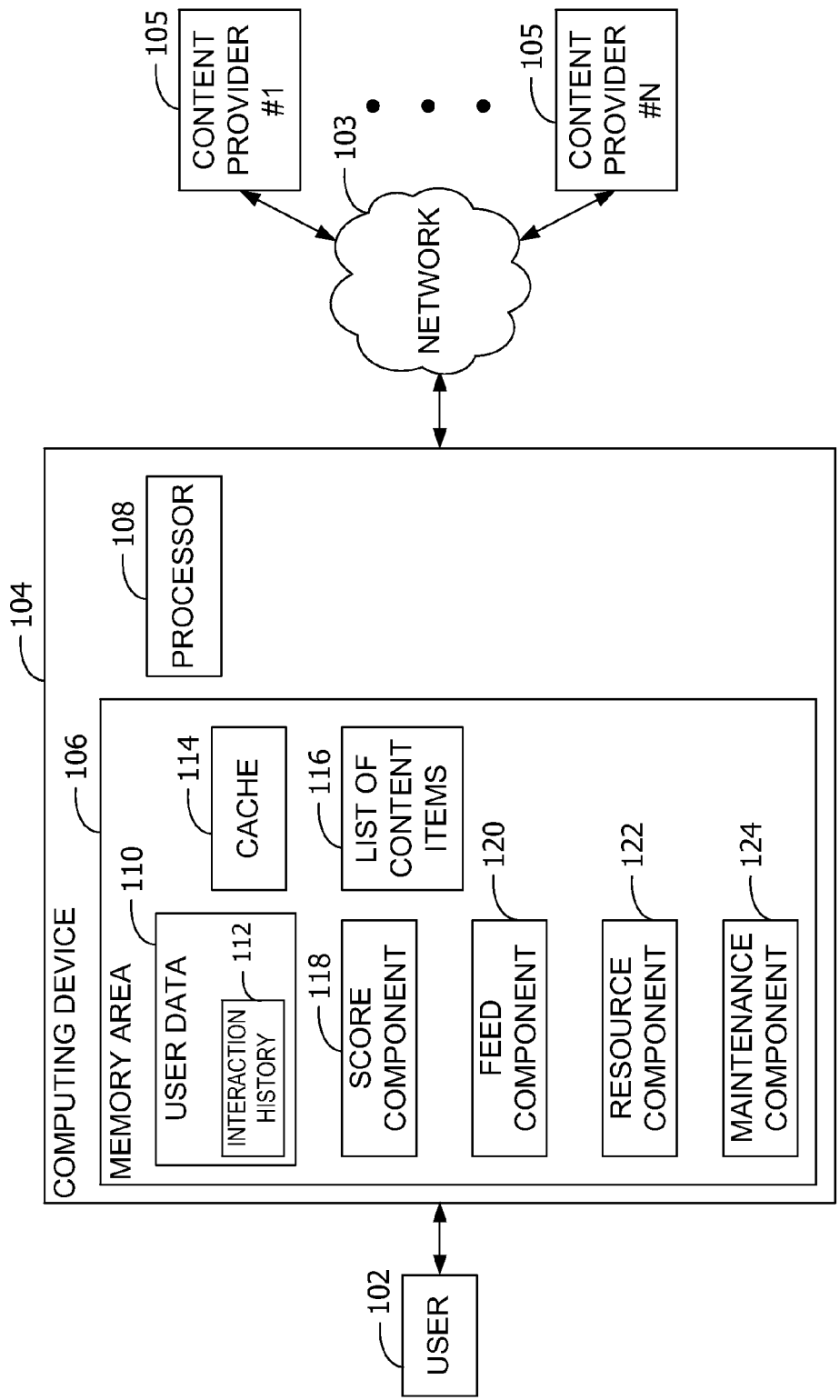
FIG. 1 is an exemplary block diagram illustrating a computing device receiving content items from a plurality of content providers.

Referring to the figures, embodiments of the disclosure enable, at least, a heuristic pre-fetch of content items based on a social distance between a user 102 and content providers 105. The pre-fetched content items represent the content items determined to be of possible interest to the user 102 based on the social distance. Aspects of the disclosure prioritize resource usage on a computing device 104 of the user 102 providing greater value per cost (e.g., storage space, battery, bandwidth, etc.). In some embodiments, the computing device 104 includes a mobile computing device 402 such as a mobile telephone with limited resources.

The user 102 has a relationship with each of the content providers 105. The closeness of each relationship varies based on each of the content providers 105. For example, the user 102 may be a relative or close friend of one of the content providers 105. In such an example, the user 102 has a strong interest in viewing content items from that content provider 105. In another example, the user 102 is only an acquaintance of the content provider 105 and has not historically shown interest in the content provider 105 or the content items of the content provider 105. In such an example, the user 102 may have only marginal interest in viewing new content items from this content provider 105.

A social distance value represents a degree of closeness between the user 102 and each of the content providers 105. The social distance value is associated with one user and one of the content providers 105, although different content providers 105 may have the same social distance value for the same user. The social distance value may be implicitly or explicitly defined or calculated (e.g., see FIG. 3). Exemplary social distance values may range from zero to one or zero to one hundred, or may be selected from any defined set or range of values.

Referring again to FIG. 1, an exemplary block diagram illustrates the computing device 104 receiving content items from the plurality of content providers 105. The elements illustrated in FIG. 1 operate to enable selective pre-fetch of the content items. For example, the content items are pre-fetched as the user 102 browses other content items (e.g., active pre-fetch), or the content items are pre-fetched while the computing device 104 is idle (e.g., background pre-fetch).

Figure 4:
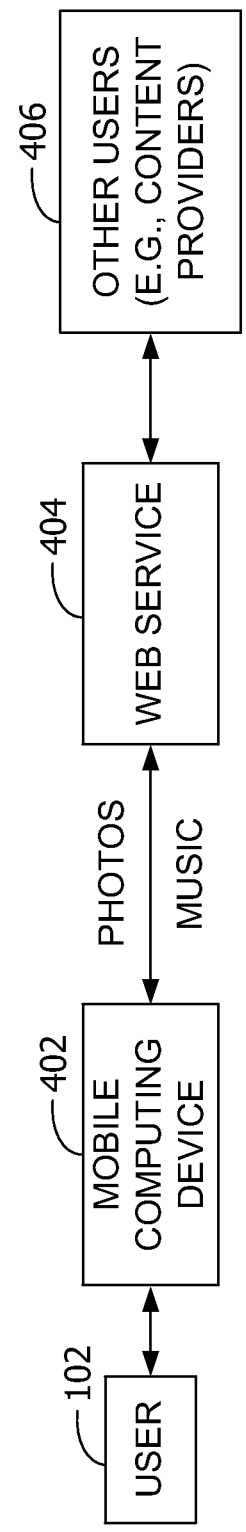
FIG. 4 is an exemplary block diagram illustrating a mobile computing device communicating with a web service to download photos and music.

In some embodiments, the computing device 104 represents the mobile computing device 402 such as illustrated in FIG. 4. In other embodiments, the computing device 104 represents a plurality of computing devices programmed to implement the functionality described herein. Alternatively or in addition, a portion of the functionality is performed by other computing devices (e.g., executing a web service).

The computing device 104 communicates with content providers 105, such as content provider #1 through content provider #N, via a network 103 such as the Internet. The content providers 105 represent, for example, distributors or repositories of content such as social networking web sites or photo sharing web sites. In other embodiments, the content providers 105 represent content authors. The computing device 104 includes at least a memory area 106 and a processor 108. The memory area 106, or other computer-readable media or machine-readable media, stores user data 110. The user data 110 may include data particular to one or more of the users 102 of the computing device 104. The user data 110 may be stored locally as in the example of FIG. 1, or stored remotely such as by a web service (e.g., a social content web service storing user profile information) and synchronized to the computing device 104. In some embodiments, the user data 110 includes an interaction history 112 describing interactions between the user 102 and the content provider 105. For example, the user data 110 includes a browsing history. Other exemplary user data 110 includes any user 102 behavior when consuming the content items including, for example, dwell time on particular content items.

The memory area 106 further stores a list 116 of content items. In some embodiments, the list of contents items includes a "what's new" feed of content recently made available. For example, the content items include one or more of the following: image files, video files, text files, blog postings, electronic mail messages, instant messages, audio clips, hyperlinks, and micro-blog postings. The list 116 of content items is received from at least one of the content providers 105, or from a front-edge server (not shown). The list 116 of content items may be obtained, retrieved, received, accessed, pushed, pulled, or the like, on a regular basis, periodic basis, or on demand by the user 102. For example, the computing device 104 may actively seek the list 116 of content items or may passively receive the list 116 of content items at regular intervals, in various embodiments.

In some embodiments, a portion of the memory area 106 includes a cache 114 such as a variable-size cache (e.g., a cache having a variable amount of memory allocated thereto from a file system). In other embodiments (not shown), the cache 114 is associated with another storage area either within the computing device 104 or accessible by the computing device 104. The cache 114 stores one or more of the content items received from the content providers 105. In some embodiments, the cache 114 is a fixed-size cache that has been allocated a particular amount of memory from a file system.

The memory area 106, or one or more computer-readable media, further stores computer-executable components for implementing aspects of the disclosure. Exemplary components include a score component 118, a feed component 120, a resource component 122, and a maintenance component 124. These components are described below with reference to FIG. 3.

In general, the memory area 106 is associated with the computing device 104. For example, in FIG. 2, the memory area 106 is within the computing device 104. However, the memory area 106 includes any memory area internal to, external to, or accessible by computing device 104. Further, the memory area 106 or any of the data stored thereon may be associated with any server or other computer, local or remote from the computing device 104 (e.g., accessible via a network).

The processor 108 includes any quantity of processing units, and is programmed to execute computer-executable instructions for implementing aspects of the disclosure. The instructions may be performed by the processor 108 or by multiple processors executing within the computing device 104, or performed by a processor external to the computing device 104 (e.g., by a cloud service). In some embodiments, the processor 108 is programmed to execute instructions such as those illustrated in the figures (e.g., FIG. 2 and FIG. 3).

Figure 2:
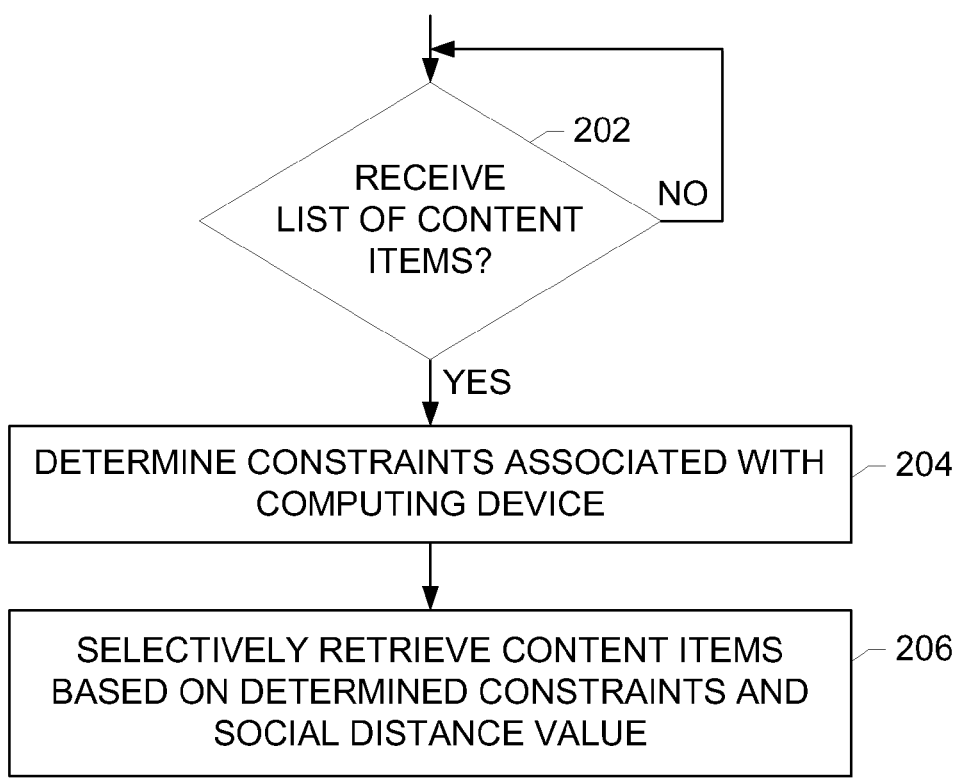
FIG. 2 is an exemplary flow chart illustrating the selective retrieval of content items based on social distance and device constraints.

Referring next to FIG. 2, an exemplary flow chart illustrates the selective retrieval of content items based on social distance and device constraints. The content items include, for example, audio, text, video, and images data (e.g., files, streamed data, etc.). In some embodiments, the content items include electronic mail messages, and text messages. When the list 116 of content items is received at 202, one or more constraints associated with the computing device 104 are determined at 204. For example, the computing device 104 retrieves, receives, or accesses the list 116 of content items from one of the content providers 105 or from another entity. In some embodiments, the list 116 of content items is sorted by the content providers 105 according to the social distance values. The computing device 104 receives the sorted list, and is able to quickly identify the content provider 105 "closest" to the user 102 based on the social distance value. In other embodiments, the computing device 104 receives an unsorted list 116 of content items and sorts the content items by the social distance value of the content providers 105 associated with each of the content items on the list. In such embodiments, the content items associated with a first-ranked content provider 105 are retrieved before content items associated with lesser-ranked content providers 105 are retrieved.

Exemplary constraints associated with the computing device 104 include hardware and/or software constraints such as storage constraints, battery/power constraints, and bandwidth constraints. The determined constraints represent, for example, an available amount of storage on the computing device 104, a remaining amount of battery power on the computing device 104, and available bandwidth resources. The bandwidth resources represent, for example, available bandwidth between the computing device 104 and the content providers 105. Other exemplary constraints include limitations or configurations relating to processing power (e.g., the processor 108 usage rate exceeds a pre-defined threshold, etc.). Still other exemplary constraints are associated with software executing on the computing device 104 (e.g., a quantity of threads exceeds a pre-defined threshold value).

Content items are selectively retrieved at 206 from the content providers 105 based on the determined constraints and the social distance values for each of the content providers 105. In some embodiments, selectively retrieving the content items includes retrieving the content items associated with a first-ranked content provider 105 and then only a portion of the content items associated with one or more of the lower-ranked content providers 105 (e.g., a second-ranked content provider 105). In other embodiments, only content items associated with content providers 105 having social distance values exceeding a pre-defined threshold are retrieved.

In some embodiments, the operations at 202, 204, and 206 are performed prior to receiving a request from the user 102 for the content items that have been selectively retrieved. For example, the operations are performed as the user 102 is browsing the Internet, a photo collection, a music library, etc. The content items are pre-fetched and cached in anticipation of receiving the request from the user 102 for one or more of the cached content items (e.g., pre-fetch the content items moments before the user 102 requests the content items). Aspects of the disclosure are then able to quickly deliver the requested content items to the user 102 responsive to receiving the request. Such embodiments of the disclosure improve the user experience on the computing device 104.

Figure 3:
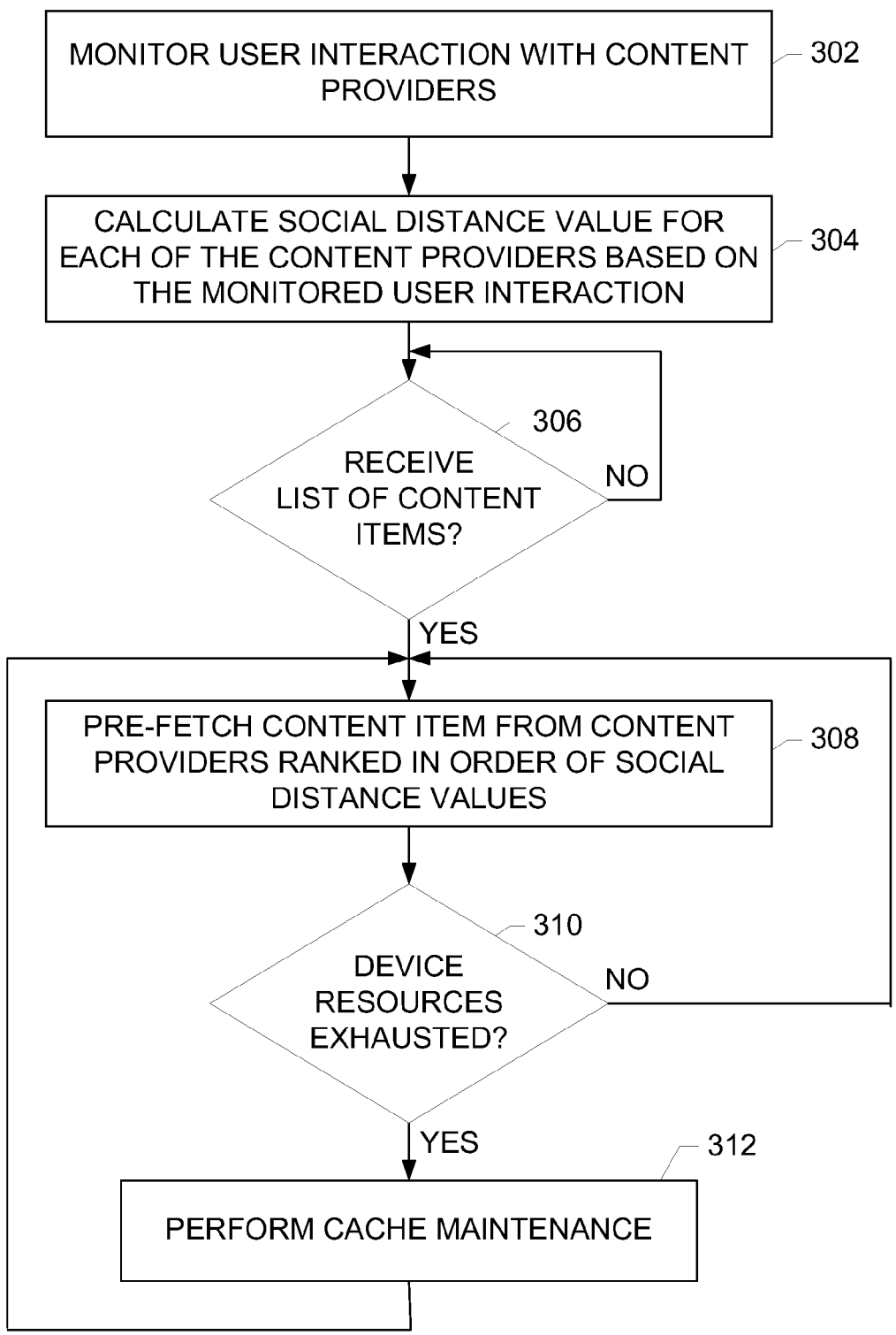
FIG. 3 is an exemplary flow chart illustrating the pre-fetching of content items associated with ranked content providers.

Referring next to FIG. 3, an exemplary flow chart illustrates the pre-fetching of content items associated with ranked content providers 105. At 302, user 102 interaction with the content providers 105 is monitored. For example, aspects of the disclosure identify the content providers 105 associated with images selected and viewed by the user 102, measure and store a quantity of time the user 102 spends browsing a photo gallery of a particular one of the content providers 105, count messages exchanged between the user 102 and the content providers 105, and the like. In some embodiments, the data from the monitored interactions is stored as a portion of the user data 110 in the memory area 106.

At 304, the social distance value for each of the content providers 105 is calculated based at least on the user interaction monitored at 304. Each of the content providers 105 then has a social distance value associated therewith. The social distance value is representative of a relationship between the content provider 105 and the user 102. The social distance value may be calculated based in part on the user data 110 including calendar events, electronic mail messages, interaction history 112, and the like. In some embodiments, a fitness function is used to calculate the social distance value.

Table 1 below illustrates exemplary variables, values, and weights for calculating the social distance values. In some embodiments, the variables are calculated in a rolling 30-day window, or shorter if the cache history is shorter.

TABLE 1

Exemplary Variables, Values, and Weights for Calculating Social Distance Values.

| Variable | Values | Weight | Notes |
|---|---|---|---|
| Percentage of the content provider's photo events drilled into by the user | 0%-100% | 0.4 | Clicking on the album title or any thumbnail associated with the photo event counts in this variable. |
| Quantity of comments made by the user on this content provider's photos | 0-4 | 0.2 | The user commenting on at least one photo a week equates to full weight. |
| Quantity of times the user opened the contact card of this content provider | 0-12 | 0.1 | The user opening the contact card of the content provider more than three times a month equates to full weight. |
| Quantity of messages the user has exchanged with this content provider | 0-30 | 0.3 | The user trading a message every day on average equates to full weight. |

In some embodiments, the values in Table 1 are combined according to the weights in a linear fashion (e.g., summed) to calculate the social distance value. In other embodiments, the values are combined in other mathematical ways, or augmented with additional data or calculations, to calculate the social distance values.

When the computing device 104 receives the list 116 of content items at 306, the computing device 104 pre-fetches one of the content items at 308 from the content providers 105 who are ranked in order of social distance values. The content item is retrieved from the highest-ranking content provider 105 rather than a lower-ranking content provider 105. In some embodiments, a plurality of the content items is pre-fetched at 308. For example, two content items may be retrieved at a time.

Resources on the computing device 104 are also monitored. For example, the available storage space, bandwidth, and battery power level are monitored at regular or irregular intervals. If one or more of the resources are exhausted (e.g., at levels that violate or exceed pre-defined thresholds) at 310, resource maintenance is performed. For example, cache maintenance is performed at 312. Exemplary cache maintenance includes deleting older content items from the cache 114, compressing content items, and other routine or typical cache maintenance items. The age of content items in the cache 114 is determined by, for example, an item date associated with each of the content items. The item date corresponds to the most recent date/time the computing device 104 refreshed, accessed, pre-fetched, sent, or received the content item. For example, full screen images may be removed from the cache 114, except for the most recent ten images or images less than twelve hours old. Image metadata and thumbnails older than 72 hours may also be removed. In some embodiments, the cache maintenance is also performed on a regular basis (e.g., each day and/or when the computing device 104 powers on). After performing the cache maintenance at 312, another content item is pre-fetched at 308.

If the resources of the computing device 104 are not exhausted at 310, another content item is pre-fetched at 308.

In some embodiments, at least some of the operations illustrated in FIG. 3 are performed prior to receiving a request from the user 102 for the retrieved content items. In this manner, aspects of the disclosure observe the user interactions, and pre-fetch the content items believed to be of interest to the user 102 prior to the user 102 actually requesting those content items. Aspects of the disclosure provide an improved user experience when browsing photos or other content on the computing device 104. Analogously, aspects of the disclosure enable a graceful degradation of the user experience when resources on the computing device 104 become more limited.

In some embodiments, one or more computer-executable components, such as the components illustrated in FIG. 1, execute on the computing device 104 to perform the operations illustrated in FIG. 3. The score component 118, when executed by the processor 108, causes the processor 108 to calculate the social distance value for each of the content providers 105. The feed component 120, when executed by the processor 108, causes the processor 108 to access the list 116 of content items. The resource component 122, when executed by the processor 108, causes the processor 108 to monitor available storage in the memory area 106 (e.g., the cache 114) of the computing device 104. In other embodiments, the available storage is in a removable storage area such as a flash drive. In an example in which the resource component 122 determines that the monitored storage exceeds a pre-defined threshold value, the maintenance component 124 further deletes at least one of the content items stored in the memory area 106.

The maintenance component 124, when executed by the processor 108, causes the processor 108 to selectively retrieve one or more of the content items on the list based on the social distance value calculated by the score component 118 and based on the available storage monitored by the resource component 122. The retrieved content items are stored in the memory area 106. In some embodiments, the retrieval occurs prior to receiving a request from the user 102 for the content items.

The resource component 122 further monitors various other resources such as a battery level. If the battery level reaches, exceeds, passes, violates, or otherwise crosses a pre-defined threshold, the maintenance component 124 ceases to retrieve the content items until the battery is charged (or charging).

In some embodiments, the score component 118 calculates the social distance value based on a plurality of configurable parameters. In some embodiments, the configurable parameters are determined from one or more of the following: a frequency of access by the user 102 to content items associated with each of the content providers 105, a quantity of comments posted by the user 102 for the content items associated with each of the content providers 105, and a quantity of messages exchanged between the user 102 and each of the content providers 105.

In some embodiments, the operations illustrated in FIG. 2 and FIG. 3 are performed by the computing device 104. In other embodiments, one or more of the operations illustrated in FIG. 2 or FIG. 3 are performed by another computing device (e.g., as a web service).

In other embodiments, at least a portion of the functionality of the computing device 104 is performed by an entity (e.g., processor 108, web service, server, application program, computing device, etc.) remote from the computing device 104 of the user 102.

Referring next to FIG. 4, an exemplary block diagram illustrates the mobile computing device 402 communicating with a web service 404 to download photos and music. The user 102 operates the mobile computing device 402 to interact with the web service 404. The web service 404 includes any combination of computing devices providing the content items. Other users 406 or entities provide the content items to the web service 404. In this example, the other users 406 constitute the content providers 105.

In an example, the user 102 browses photos and music via a browser executing on the mobile computing device 402. The user 102 views some thumbnail images, and tags the names of a few friends in a "spring break" photo album. Aspects of the disclosure pre-fetch full screen images for the thumbnails associated with the tagged friends. If any of the pre-fetched full screen images have comments or other tags, aspects of the disclosure also fetch the comments and tags. When the user 102 selects one of the thumbnails to view a full screen image, the full screen image has already been fetched and is displayed instantly.

Further Examples

Various implementations of the disclosure are contemplated. During operation in one example, the computing device 104 receives a "What's New" feed of the latest social events. The feed includes, for example, subject display names, identifiers such as users, object display names or identifiers such as photo albums, strings denoting relationships such as "John became friends with Jane", and the like. In this example, the computing device 104 ranks the content providers 105 associated with the photo albums listed in the "What's New" feed according to the social distance value of each of the content providers 105. The list of ranked content providers 105 is pruned to include only those content providers 105 with a social distance value exceeding a pre-defined threshold value (e.g., only those content providers 105 deemed close enough to the user 102).

Photos from all of the new albums from the first-ranked content provider 105 (e.g., author of the photo album) are pre-fetched, starting with the most recent album first. For example, the computing device 104 pre-fetches the first eighteen thumbnails in the photo album and the full screen images associated with those thumbnails. Alternatively, the computing device 104 pre-fetches the first nine thumbnails and up to the first five full screen images associated with those thumbnails. Once all the albums from the first-ranked content provider 105 have been pre-fetched, a fraction of the photos from the new albums for the second-ranked content provider 105 is pre-fetched. For example, the fraction is determined by the ratio of the social distance value of the second-ranked content provider 105 to the social distance value of the first-ranked content provider 105, rounded down to the nearest whole album.

The pre-fetching process continues in this manner through the successive ranked content providers 105 until a termination condition is reached. The termination condition is dependent on various resources on the computing device 104, as described elsewhere herein (e.g., available storage, battery, and bandwidth). One example termination condition occurs when storage space has been reduced such that pre-fetching another album or photo would clear cache data from an album less than twelve hours old. Another termination condition occurs when pre-fetching consumes more than ten percent of the remaining battery power. For example, if the battery has twenty percent power remaining, the termination condition is when two percent of that power has been used for a particular pre-fetch operation. Another example is that pre-fetching does not occur if the batter power remaining is less than a particular threshold (e.g., twenty percent). Yet another termination condition occurs when bandwidth usage has been exceeded. For example, the pre-fetching operations are allotted a configurable amount of bandwidth per day. When the allotted bandwidth has been used, the pre-fetching operations cease. For example, if a pre-fetching update occurs every four hours, and there is a limit of six megabytes of bandwidth per day, pre-fetching ceases when one megabyte has been used for a particular pre-fetch update.

Examples of the pre-fetch operations are next described. In one example, there are three megabytes of cache space available and five megabytes full. The cache 114 is at minimum state so background pre-fetch does not execute. However, aspects of the invention round-robin the full screen binaries: when the user 102 requests another photo, the oldest cached photo is deleted to make space. In another example, the variable-size cache is full of fifty megabytes of data, while the rest of the storage medium has fifty megabytes available for other storage uses. If the user 102 downloads music files and fills all but 1.5 megabytes of the previously available fifty megabytes on the storage medium, aspects of the disclosure will reduce the cache size during the next cache maintenance operation. In still another example, the user 102 uses messaging but not photos. For this user 102, the pre-fetch operations turn off after seven days, any pre-fetched content items are removed thirty days later, and the cache 114 is disabled (returning the cache space to the computing device 104 for other uses). In yet another example, there are 0.1 megabytes of cache space available out of five megabytes of allotted cache space, and five megabytes of storage space remaining on the storage medium. The pre-fetch operations store the content items in the 0.1 megabytes of available cache space, then the pre-fetch operations cease.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks 310 or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for prioritizing usage of resources on the computing device 104 based on a social distance between the user 102 and the content providers 105, and exemplary means for prioritizing content retrieval on the computing device 104 based on the social distance between the user 102 and the content providers 105.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for pre-fetching content on a mobile computing device associated with a user, said system comprising:
 a memory area for storing user data; and
 a processor programmed to:
  monitor interaction between the user and the mobile computing device;
  store the monitored interaction in the memory area as a portion of the user data;
  calculate a social distance value for each content provider based at least on the user data stored in the memory area, said social distance value representing a relationship between the content provider and the user, the social distance value being calculated using a fitness function that combines values of variables according to weights of the variables; and
  selectively retrieve one or more of the content items on the list based on the calculated social distance value, wherein the processor is programmed to retrieve said one or more of the content items prior to receiving a request from the user for said one or more of the content items, the retrieved content items comprising content items from a first-ranked content provider and a fraction of the content items from a lower-ranked content provider, the fraction being determined by a ratio of the social distance value of the lower-ranked content provider to the social distance value of the first-ranked content provider.

2. The system of claim 1, wherein the processor is further programmed to determine one or more constraints associated with the mobile computing device, and wherein the processor is programmed to retrieve said one or more of the content items as a function of the determined constraints.

3. The system of claim 1, wherein the memory area includes a variable-size cache, and wherein the processor is programmed to define a quantity of the content items to retrieve based on available storage within the variable-size cache.

4. The system of claim 1, wherein the user data includes an interaction history describing interactions between the user and the content provider, and wherein the processor is programmed to calculate the social distance value based at least on the interaction history.

5. The system of claim 1, wherein the user data comprises a browsing history of the user, and wherein at least one of the variables comprises a quantity of times the user opened a contact card of the content provider.

6. The system of claim 1, wherein the content items comprise one or more of the following: image files, video files, text files, blog postings, electronic mail messages, instant messages, audio clips, hyperlinks, and micro-blog postings.

7. The system of claim 1, further comprising:
 means for prioritizing usage of resources on the mobile computing device based on a social distance between the user and the content providers; and
 means for prioritizing content retrieval on the mobile computing device based on a social distance between the user and the content providers.

8. A method comprising:
 accessing a list of content items each having a content provider associated therewith, each content provider having a social distance value associated therewith, said social distance value representing a relationship between the content provider and a user, the social distance value associated with each content provider being calculated using a fitness function that combines values of variables according to weights of the variables;
 determining constraints associated with a computing device of the user; and
 selectively retrieving one or more of the content items on the list based on the social distance value and as a function of the determined constraints, wherein said accessing, said determining, and said retrieving occur prior to receiving a request from the user for said one or more of the content items, said one or more of the content items being retrieved in anticipation of receiving the request from the user as the user browses other content items, the retrieved content items including content items associated with a first-ranked content provider and a portion of the content items associated with a lower-ranked content provider, the portion of the content items associated with the lower-ranked content provider being determined by a ratio of the social distance value of the lower-ranked content provider to the social distance value of the first-ranked content provider.

9. The method of claim 8, wherein accessing the list of content items comprises receiving a list of content items sorted by the social distance value of the content provider associated with each of the content items.

10. The method of claim 8, wherein each content provider is ranked based on the social distance value.

11. The method of claim 8, wherein selectively retrieving said one or more of the content items comprises first retrieving the content items associated with the first-ranked content provider.

12. The method of claim 11, wherein selectively retrieving said one or more of the content items further comprises retrieving the portion of the content items associated with the lower-ranked content provider after retrieving the content items associated with the first-ranked content provider.

13. The method of claim 8, wherein selectively retrieving said one or more of the content items comprises retrieving said one or more of the content items based on one or more of the following: available memory storage on the computing device, a battery level of the computing device, and a bandwidth of a connection between the computing device and a server computing device associated with the content provider.

14. The method of claim 8, wherein determining the constraints associated with the computing device comprises determining constraints associated with software executing on the computing device.

15. The method of claim 8, further comprising identifying content items associated with content providers having social distance values exceeding a pre-defined threshold value, and wherein selectively retrieving said one or more of the content items comprises selectively retrieving the identified content items.

16. One or more computer storage media storing computer-executable components, said components comprising:
 a score component that when executed by at least one processor causes the at least one processor to calculate a social distance value for each of a plurality of content providers using a fitness function that combines values of a plurality of configurable parameters according to weights of the plurality of configurable parameters, each social distance value representing a relationship between the content provider and a user;
 a feed component that when executed by at least one processor causes the at least one processor to access a list of content items each associated with one of the content providers;
 a resource component that when executed by at least one processor causes the at least one processor to monitor available storage in a memory area associated with the computing device; and
 a maintenance component that when executed by at least one processor causes the at least one processor to selectively retrieve one or more of the content items on the list based on the social distance value calculated by the score component and based on the available storage monitored by the resource component, wherein the retrieval occurs prior to receiving a request from the user for said one or more of the content items, the retrieved content items comprising content items from a first-ranked content provider and a fraction of the content items from a second-ranked content provider, wherein the fraction is determined by a ratio of the social distance value of the second ranked content provider to the social distance value of the first-ranked content provider, and wherein the retrieved content items are stored in the memory area.

17. The computer storage media of claim 16, wherein the resource component further determines that the monitored storage exceeds a pre-defined threshold value, and wherein the maintenance component further deletes at least one of the content items stored in the memory area responsive to the determination by the resource component.

18. The computer storage media of claim 16, wherein the plurality of configurable parameters comprises one or more of the following: a percentage of each content provider's one or more content items drilled into by the user, and a quantity of times the user opened a contact card of the content provider.

19. The computer storage media of claim 18, wherein the plurality of configurable parameters are determined from one or more of the following: a frequency of access by the user to content items associated with each of the content providers, a quantity of comments posted by the user for the content items associated with each of the content providers, and a quantity of messages exchanged between the user and each of the content providers.

20. The computer storage media of claim 16, wherein the maintenance component ceases to retrieve said one or more of the content items when a battery level associated with the computing device reaches a pre-defined threshold value.

* * * * *